United States Patent [19]

Wurzburg et al.

[11] 4,428,972

[45] Jan. 31, 1984

[54] STARCH THICKENER CHARACTERIZED BY IMPROVED LOW-TEMPERATURE STABILITY

[75] Inventors: Otto B. Wurzburg, Whitehouse Station, N.J.; Virgil L. Fergason, Decatur, Ill.

[73] Assignee: National Starch and Chemical Corporation, Bridgewater, N.J.

[21] Appl. No.: 314,311

[22] Filed: Oct. 23, 1981

[51] Int. Cl.$^3$ .............................................. A23L 1/195
[52] U.S. Cl. .................................... 426/578; 426/579; 426/658; 426/661; 426/589; 127/32; 127/33; 127/69; 127/70; 127/71
[58] Field of Search ............... 426/578, 579, 658, 661, 426/589; 127/32, 33, 69, 70, 71

[56] References Cited

U.S. PATENT DOCUMENTS

| | | | |
|---|---|---|---|
| 2,653,876 | 9/1953 | Hanson | 426/579 |
| 2,935,510 | 5/1960 | Wurzburg | 426/578 |
| 3,369,910 | 2/1968 | Ganz | 426/578 |
| 3,525,672 | 8/1970 | Wurzburg | 426/579 |
| 3,669,687 | 6/1972 | D'Ercole | 426/579 |
| 3,754,935 | 8/1973 | Glicksman | 426/579 |

OTHER PUBLICATIONS

Advances in Agronomy, vol. 20, Academic Press, 1968 pp. 275-322.
Sandstedt, R. M. et al. "The Effects of Genetic Variations in Maize on the Properties of the Starches" Bull. 1894, Nebraska Agricultural Experiment Station. *Genetics*, 52, pp. 1175-1186, Dec. 1965.

*Primary Examiner*—Jeanette M. Hunter
*Attorney, Agent, or Firm*—Edwin M. Szala; Ellen T. Dec

[57] ABSTRACT

A thickener is prepared comprising water and a waxy starch from a selected plant of a wxsu2 genotype, the sol of which starch exhibits superior resistance to breakdown on storage at low temperatures. The starch may optionally be modified. The thickener, which preferably employs a starch extracted from maize, is particularly useful for food applications.

14 Claims, No Drawings

STARCH THICKENER CHARACTERIZED BY IMPROVED LOW-TEMPERATURE STABILITY

BACKGROUND OF THE INVENTION

This invention relates to a thickener containing starch, the aqueous sol of which is characterized by its superior low-temperature stability as indicated by its resistance to repeated freezing and thawing cycles, and to foodstuffs containing same.

Starch, in general, contains two types of polymers: a linear one known as amylose and a branched polymer known as amylopectin. Waxy starches, produced from such grains as waxy maize, waxy rice and waxy sorghum, contain a very much higher level of amylopectin than ordinary corn starch, and are of particular value in applications where the starch serves primarily as a thickener or stabilizer, and where a stable sol which resists retrogradation is desired.

To meet the critical needs of the food industry, in terms of food quality, processing, packaging and distribution, native waxy starches are often modified by numerous techniques known in the industry to change the behavioral characteristics yet still essentially retain the caloric value of the native (unmodified) starch.

One type of modification commonly employed in the art is crosslinking of the starch. When an aqueous dispersion of native starch is heated, the starch granules begin to swell, and the dispersion develops a short, salve-like texture which is essential in imparting palatability and in thickening food systems. However, during the process of cooking native starches, this textural state, particularly with waxy starches, rapidly changes to an elastic, rubbery state when the swollen granules rupture, and minor variations in cooking time, temperature, and concentration as well as shear and pH are sufficient to effect this transformation. Crosslinking modifications act to strengthen the granules by reinforcing the hydrogen bonds which are responsible for holding the granules intact and thus are used to overcome the extreme sensitivity of the swollen starch granules to handling and processing conditions.

Aqueous dispersions of crosslinked starch are often used under conditions which involve prolonged storage at relatively low temperatures and/or exposure, at times, to repeated freezing and thawing cycles. Thus, starch dispersions are used in fruit pie fillings, which are frequently canned, as well as in a number of frozen foods, such as frozen pies, soups and the like. In the case of canned food products, these are often stored in warehouses which have no heating facilities and may, therefore, be at very low temperatures for prolonged periods. Frozen foods are also subject to long term storage at very low temperatures. Under such circumstances involving exposure to low temperature, there is a distinct loss in the hydrating power of the starch which is present in such food products, thereby resulting in syneresis, an exudation of liquid, together with a marked deterioration in the texture, color and clarity of the food product. While sols of waxy starches are superior in stability to those of regular starches, even they are prone to intermolecular association during storage at or near freezing temperature.

Attempts to overcome these difficulties have in the past involved the introduction of substituted branches onto the starch molecule by means of various chemical derivatization reactions, for example, reacting the starch with a monofunctional reagent to introduce substituents such as hydroxypropyl, phosphate, acetate or succinate groups. Such substituents stabilize the starch by interfering with the association between molecules or portions of the same molecule, thus reducing the tendency of the substituted starches to lose their hydration ability and clarity on storage particularly at low temperatures.

These derivatization reactions alone may be carried out on native starches to improve their low-temperature stability, but are frequently employed in combination with crosslinking to obtain starches for use as thickeners in canned pie fillings, retorted puddings, etc., which will keep the food from losing its clarity and texture during storage or shipment in the winter and while frozen.

In recent years there has been a trend toward searching for starches which have all of the properties of a modified starch but without the chemical treatment. U.S. Pat. No. 3,525,672 issued Aug. 25, 1970 to Wurzburg et al. discloses treating an inhibited starch with an enzyme such as beta-amylase to impart freeze-thaw stability thereto, but this is not at present a commercially feasible process.

Accordingly, it is an object of the present invention to provide a thickener containing starch the sol of which exhibits the low-temperature stability characteristics of chemically stabilized waxy starches.

It is a further object to provide a thickener containing a starch particularly suited for use in preparing foodstuffs having good low-temperature stability.

SUMMARY OF THE INVENTION

The above and related objects are achieved in an improved thickener composition comprising water and a waxy starch from a plant of a wxsu2 (homozygous) genotype, which starch is characterized by having a sol capable of withstanding at least one freeze-thaw cycle more than a sol of a native waxy starch from the respective plant which is not of a wxsu2 genotype. The mutant waxy starch from a selected plant species herein may be native or derivatized and/or crosslinked and will have a sol which will withstand at least one freeze-thaw cycle more than a sol of a common, ordinary, native waxy starch from the same plant species.

In preparing the thickener composition herein, the specified starch is mixed with water in any suitable proportion depending on its end-use, and the mixture is thereafter cooked as necessary. If the starch has been modified so as to be "cold water swellable", then cooking is unnecessary. It is noted that in forming the thickener, satisfactory results are generally obtained on mixing about 1-20% by weight of the starch with about 80-99% water, but proportions outside of these percentages may also be satisfactory in some applications.

It is to be understood that the invention herein is meant to include not only thickeners containing starch but also those thickeners containing flour or any ground products from the plant such as, for example, grits, hominy and meal.

The sugary-2 genotype (designated as su2) is known to alter the carbohydrate composition of the maize endosperm, and the double-recessive mutant of the waxy (designated as wx) sugary-2 genotype is also known. It is unexpected, however, that the sol of a starch obtained from a waxy sugary-2 genotype would have excellent resistance to low-temperature breakdown, as compared with the sol of a corresponding ordinary native waxy maize starch, which will withstand only about one freeze-thaw cycle before losing its water-binding properties, gelling and exhibiting syneresis. The properties obtainable in the compositions of this invention were only achieved in the past by chemical derivatization of the waxy starch with a monofunctional reagent. The derivatization necessary to provide the composition of this invention with exceptional freeze-thaw properties is less than that required for a waxy starch.

The thickener composition herein may be advantageously employed in any foodstuff wherein a native or crosslinked or derivatized or crosslinked derivatized starch is utilized, such as, for example, in puddings, pie fillings, sauces, gravies, baby foods and the like. It is especially desirable, however, in foods subjected to storage at low temperatures, and in frozen foods. It is also especially desirable in applications where use of a waxy starch is preferable, i.e. where the starch functions predominately as a thickener or stabilizer.

DESCRIPTION OF THE PREFERRED EMBODIMENTS

In a preferred embodiment of this invention, the starch employed in the thickener of this invention is extracted from maize grown from double-recessive mutants of the waxy sugary-2 genotype, designated for purposes herein as wxsu2. The waxy gene is located at position 59 of Chromosome 9 of corn while the sugary-2 gene is located at position (57) of Chromosome 6. (See M. G. Nueffer, L. Jones, and M. Zuber, "The Mutants of Maize" (Crop Science Society of America, Madison, WI, 1968), pp. 72 and 73.).

Also within the scope of this invention is the starch resulting from wxsu2 mutants wherein the wx and/or su2 genotypes have been moved to another portion of the plant genome by translocation, inversion, or any other methods of chromosome engineering. In addition, starch extracted from a plant grown from artificial mutations and variations of the above genetic composition which may be produced by known standard methods of mutation breeding is also applicable herein. Our designation of the mutant as the wxsu2 genotype is intended to mean that the mutant will necessarily contain the wx and su2 genes, but is not limited thereto.

The waxy genotype imparts to the corn plant the ability to produce a starch which consists primarily or totally of amylopectin, and the phenotype, or physical expression, of the endosperm of the waxy genotype is opaque with a hard waxy texture. The phenotype of the endosperm of the sugary-2 genotype, on the other hand, is translucent and sometimes wrinkled. The results of an investigation by R. Creech into the effect of sugary-2 and waxy gene mutations, singly and in combination, on the maize endosperm and the properties thereof are reported in *Advances in Agronomy*, Vol. 20 (Academic Press, 1968), pp. 275–322 and in *Genetics*, 52, pp. 1175–1186, December, 1965. An article by R. M. Sandstedt, B. D. Hites, and H. Schroeder, entitled "The Effects Of Genetic Variations In Maize On the Properties Of The Starches", published as paper no. 1894, Nebraska Agricultural Experiment Station, describes several properties of starches obtained from various genetic mutants of maize including wxsu2. While the data in that report show the particular wxsu2 starch used there to have a greater sol stability to heat as well as a lower gelatinization temperature than the wx starch, such properties are not indicative of superior low-temperature stability. Starches obtained from mutant maize are also described by H. H. Kramer et al. in an article entitled "Gene Interactions In Maize Affecting Endosperm Properties" which appeared in *Agron. J.*, 50, pp. 207–210 (1958).

To obtain the double-recessive mutant of the wxsu2 genotype in maize in a usual manner, one may, for example, cross a waxy mutant (wx) with a sugary-2 mutant (su2), and thereafter self pollinate the first generation single cross (Wx wx Su2 su2) to theoretically recover the double mutant in a 15:1 ratio from a segregating ear. The starch utilized in this invention may be obtained from inbred lines, but it is more desirable that the starch be obtained from hybrids derived from inbreds containing the wxsu2 double-recessive mutant, ordinarily because of higher yields and other factors. While maize is the preferred specific plant herein for the source of the waxy starch, the invention is also applicable to other plant species such as, for example, waxy rice, waxy barley and waxy sorghum, provided that they are of a wxsu2 genotype.

Extraction of the starch from the kernel of the maize grown from the double-recessive mutant seed may be carried out in a standard manner by the wet-milling or dry-milling process well known in the art, but is not limited to such methods. In one typical wet-milling process, which is preferred herein but serves only as an example of suitable such processes, the corn is cleaned by strong currents of air, sifters and electromagnets to remove unwanted material. It is thereafter steeped in warm water containing a small amount of sulfur dioxide. The steep-water is drawn off and the softened kernels are run through attrition mills to tear them apart. The germ is removed and the remaining mixture is ground, washed and sieved as a slurry. The starch is separated from the gluten by centrifugation, and the remaining slurried starch is then filtered, washed, resuspended and refiltered.

Extraction of flour or variants thereof from the maize kernel is accomplished by a dry-milling process. In a typical such procedure which is suitable herein but not exclusive of other procedures, the corn is first thoroughly cleaned and passed through a scourer and is then tempered or conditioned and passed through a corn degerminator. Stock from the degerminator is dried and then cooled, passed through a hominy separator and aspirator, ground, and finally sifted according to whether whole or separate fractions are desired.

It can be understood that some modifications in either of the above extraction processes such, for example, as using a steep-water temperature below that which is commonly employed, may be desirable and will be easily recognized by a starch practitioner.

The starch or flour thus obtained is tested for its properties at low temperature by the usual techniques wherein a sol is formed, as described further hereinbelow.

The starch herein may be modified, if desired, by procedures known in the art, such as by derivatization to form ethers or esters such as hydroxypropyl ethers, acetates, phosphates, succinates, e.g., octenyl succinate, tertiary and quaternary amine ethers, etc., or by any other modification techniques which produce a starch having the characteristics defined herein. The preferred substituent groups herein are hydroxypropyl, phosphate or acetate groups.

For commercial purposes, the preferred modification of the starch herein is crosslinking to strengthen the granules against the handling and processing conditions frequently encountered in manufacturing operations and to provide a starch capable of imparting desirable rheological properties to food systems. Any crosslinking agent may be employed for this purpose, such as, e.g., epichlorohydrin, linear dicarboxylic acid anhydrides, citric acid, acrolein, phosphorus oxychloride and trimetaphosphate salts, and the like. Other known crosslinking agents such as formaldehyde, cyanuric chloride, diisocyanates, divinyl sulfone and any other crosslinking agents capable of forming linkages between the starch molecules may also be employed if the product is not to be used in foods. Preferred crosslinking agents are those approved for use in foods and are most preferably phosphorus oxychloride, sodium trimetaphosphate (STMP) and adipic-acetic anhydride (1:4).

The crosslinking reaction itself is carried out according to standard procedures described in the literature for preparing crosslinked, granular starches such as that of, e.g., U.S. Pat. Nos. 2,328,537 and 2,801,242.

The amount of crosslinking agent necessary to give a suitable product will vary depending, for example, on the type of crosslinking agent employed, the concentration of the crosslinking agent, the reaction conditions, and the necessity for having a crosslinked starch which falls within the desired viscosity range. The practitioner will recognize which amounts may be employed, as these are well known in the art. Typically, this amount will range from as low as about 0.001%, by weight of the starch, to as high as is considered acceptable for food use.

In the examples which follow, all parts and percentages are given by weight unless otherwise noted.

The following analytical test is used in the examples to evaluate the low-temperature stability of the starch (or flour) herein. It is noted that evaluation of the low-temperature stability of the present starch would ordinarily involve extended storage thereof at such low temperatures. However, to obtain a faster but relatively accurate evaluation of the stability at low temperature, the freeze-thaw test herein was developed. A sol of the starch is prepared by mixing 375 g of starch at 12% moisture (3.3 g anhydrous) with 50 ml of distilled water. The starch slurry is adjusted, if necessary, to pH 5.0–6.0 with either 0.1 N HCl or 0.1 N NaOH, and two drops of McCormick red food color are added thereto. The slurry is cooked for 20 minutes in a boiling water bath, with stirring until the starch granules swell. The starch sol thus obtained is placed in a 2-oz jar, which is capped and placed in a freezer at 0° F. for about 66 hours. After completion of the initial freezing period, the sol is thawed at room temperature (6 hours), examined, and refrozen (18 hours) for the second cycle. Freeze periods (18 hours) and thaw periods (6 hours) are repeated for the third, fourth and fifth cycles. The sixth cycle requires a 66 hour freeze period, and the seventh through tenth cycles require an 18 hour freeze period. The test is continued until either a gel is formed which waters, or until the sol becomes opaque and its color becomes pink or there is a huge shift in viscosity and/or texture (e.g., it is thin and grainy), even though a gel has not formed. This latter state is a matter of degree. The number of successful cycles completed before the sol fails is recorded for each sample. It is to be understood that this test is a relative indication of stability, and controls are used with each set of samples.

EXAMPLE I

This example illustrates the good low-temperature stability of the native and derivatized starches herein as compared with native and derivatized waxy maize starches.

The starches indicated in Table I were prepared by wet-milling of one of the sources given. The low-temperature stability was evaluated for each starch by the above-described procedure with results indicated in Table I.

TABLE I

| Type of Starch and Source* Thereof | Repeated Freeze-Thaw Cycles |
| --- | --- |
| Native waxy maize (control) | 1 |
| Waxy maize derivatized with 3% acetic anhydride (comparative)** | 1 |
| Waxy maize derivatized with 5% acetic anhydride (comparative)** | 1 |
| Waxy maize derivatized with 5% acetic anhydride and crosslinked with 0.12% adipic-acetic anhydride (comparative)** | 1 |
| Waxy maize derivatized with 3.0% propylene oxide and crosslinked with 0.02% phosphorus oxychloride (comparative)** | 1 |
| Waxy maize derivatized with 5.0% propylene oxide and crosslinked with 0.02% phosphorus oxychloride (comparative) | 2 |
| Waxy maize derivatized with 7.5% propylene oxide and crosslinked with 0.02% phosphorus oxychloride (comparative) | 7 |
| Waxy maize crosslinked with 0.4% STMP (comparative) | 1 |
| Native wxsu2A in a C103 germ plasm | 6 |
| Native wxsu2A in a germ plasm in the Custom Farm Seed Collection - CFS 8 | 3 |
| Native wxsu2B in a OH 45 germ plasm | 3 |
| Native wxsu2B in a germ plasm in the Custom Farm Seed Collection - CFS 8 | 6 |
| Native wxsu2C in a OH 45 germ plasm | 4 |
| Native wxsu2C in a modified Hy germ plasm | 7 |
| wxsu2B in a OH 45 germ plasm crosslinked with 0.4% STMP | 3 |
| wxsu2A in a modified B37 germ plasm derivatized with 5% acetic anhydride and crosslinked with 0.12% adipic-acetic anhydride | 9 |
| A 50:50 mixture of wxsu2A in a germ plasm in the Custom Farm Seed Collection - CFS8 and wxsu2A in a modified OH7 germ plasm derivatized with 3.0% propylene oxide and crosslinked with 0.02% phosphorus oxychloride | 8 |

*The letter designations after su2 refer to the different sources from which the sugary-2 genotype was obtained.
**These samples, which would ordinarily show a freeze-thaw stability significantly improved over the native waxy maize, show no difference in stability under the severe test herein because the test measures only extreme differences in low-temperature stability.

It can be seen from these results that the sol of the native starch herein exhibits freeze-thaw characteristics superior to those of native waxy maize starch and even of acetylated waxy maize starch. It is also apparent that all three sources of the sugary-2 gene which were tested yield starches (starch thickeners) which are excellent in terms of their freeze-thaw properties.

It is also noted that the crosslinked starch of this invention has superior low-temperature stability compared to that of crosslinked waxy maize; and the crosslinked derivatized starch of this invention is far more stable at low temperatures than a crosslinked waxy maize derivatized to the same extent. In fact, the crosslinked derivatized starch herein has low-temperature stability equal to or better than crosslinked waxy maize derivatized to much higher levels. It is also noted that the underivatized crosslinked starch of this invention has low-temperature stability equal to or better than that of the crosslinked waxy maize derivatized with up to 5% propylene oxide. These results are unexpected in view of one of the well-known purposes for employing a derivatizing agent, i.e., to increase the low-temperature stability of the starch.

EXAMPLE II

The native starch derived from wxsu2A in a modified OH7 germ plasm was stirred into aqueous salt solutions of both high and low pH. Taste tests performed on the resulting starch slurries indicated that at both high and low levels of acid the starch did not adversely affect the taste of the slurries.

EXAMPLE III

Two cherry pie fillings were prepared with identical ingredients and amounts except using as the starch therein either the waxy sugary-2 mutant starch of the invention crosslinked with 0.01% phosphorus oxychloride on starch, or, for comparison, a waxy maize which was derivatized with 5% acetic anhydride and crosslinked with 0.12% of adipic-acetic anhydride. When subjected to over ten freeze-thaw cycles (wherein each cycle involves freezing the sample overnight at 17° F. and then thawing for 6–7 hours), the cherry pie filling prepared with the native waxy sugary-2 mutant starch remained stable as compared to the pie filling prepared using the derivatized waxy starch, which withstood only six freeze-thaw cycles. Both pies had good appearance, taste and texture.

EXAMPLE IV

In the preparation of tomato sauce, six peeled whole tomatoes are passed through a sieve to separate the tomato pulp from the juice. The starch of Example II is slurried in the tomato juice thus obtained (in an amount to equal 1.8% by weight of the total sauce) and the resulting slurry is cooked until thickening occurs. The tomato pulp and seasonings are then added and cooking is continued until the proper consistency in texture and viscosity is obtained. The resulting tomato sauce is found to be stable on undergoing repeated freezing and thawing cycles.

In the preparation of frozen brown gravy, the following ingredients are mixed thoroughly and the mixture is heated to 190° F.

| Beef Broth | 62.6% |
|---|---|
| Water | 24.3% |
| Starch of Ex. II | 3.0% |
| Wheat Flour | 2.0% |
| Salt | 1.4% |
| Monosodium glutamate | 0.4% |
| Spices | 1.2% |

Melted vegetable shortening, 5.1%, is slowly added to the hot mixture with constant agitation, and cooking at 190°–195° F. is continued for eight minutes. Brown color is added to the gravy, as desired, and the gravy is packed in containers and frozen. The resulting brown gravy is found to be stable on undergoing repeated freezing and thawing cycles.

In the preparation of frozen pudding (butterscotch), the following ingredients are mixed thoroughly.

| Starch of Ex. II | 19.0% |
|---|---|
| Sugar | 40.0% |
| Malto-Dextrin | 20.0% |
| Nonfat Dry Milk Solids | 20.1% |
| Salt | 0.9% |
| Butterscotch flavor | to suit |

A portion of the above mixture, 22.35%, is added to 47.65% of water and 30.00% of cream replacement. The combined mixture is heated to 185°–190° F. with good agitaion and kept at that temperature for 10–15 minutes. The resulting pudding is packed in containers and frozen, and is capable of withstanding repeated freezing and thawing cycles.

The present invention is seen to provide a thickener containing starch, the sol of which starch is characterized by low-temperature stability comparable to that obtained on use of chemically stabilized waxy starches. The thickener composition may be employed in non-food uses such, for example, as paints, pastes or adhesives, and is preferably employed as a thickener or stabilizer for a variety of foodstuffs.

Now that the preferred embodiments of the present invention have been described in detail, various modifications and improvements thereon will become readily apparent to those skilled in the art. Accordingly, the spirit and scope of the invention are to be limited only by the appended claims, and not by the foregoing specification.

What is claimed is:

1. A process for preparing a thickened foodstuff comprising combining at least a foodstuff and a sol comprising water and an effective amount of a waxy starch from a plant of a wxsu2 genotype, and translocations, inversions, mutants and variants thereof, and cooking said combination as necessary to provide a thickened foodstuff, wherein said thickened foodstuff exhibits low-temperature stability and wherein said foodstuff prepared with said sol is capable of withstanding at lease one freeze-thaw cycle more than a foodstuff prepared with a native waxy starch from the respective plant which is not of a wxsu2 genotype.

2. A process for preparing a thickened foodstuff comprising combining at least a foodstuff and a sol comprising water and an effective amount of a starch from a waxy maize of a wxsu2 genotype and translocations, inversions, mutants and variants thereof, and cooking said combination as necessary to provide a thickened foodstuff, wherein said thickened foodstuff exhibits low-temperature stability and wherein said foodstuff prepared with said sol is capable of withstanding at least one freeze-thaw cycle more than a foodstuff prepared with a native waxy maize starch which is not of a wxsu2 genotype.

3. The process of claim 2 wherein said starch of the wxsu2 genotype is native.

4. The process of claim 2 wherein said starch of the wxsu2 genotype is crosslinked.

5. The process of claim 2 wherein said starch of the wxsu2 genotype is crosslinked with a crosslinking agent selected from the group consisting of epichlorohydrin, linear dicarboxylic acid anhydrides, acrolein, phosphorus oxychloride and trimetaphosphate salt.

6. The process of claim 5 wherein the amount of said crosslinking agent employed to crosslink said starch is at least 0.001% by weight of the starch and said starch is derivatized to contain substituent groups.

7. The process of claim 2 wherein said starch of the wxsu2 genotype is derivatized to contain substitutent groups.

8. The process of claim 7 wherein said starch is derivatized to form hydroxypropyl ether, phosphate, octenyl succinate, acetate or tertiary or quaternary amine ether derivatives.

9. A thickened low-temperature stable foodstuff comprising at least a foodstuff and a sol comprising water and an effective amount of a waxy starch from a plant of a wxsu2 genotype, and translocations, inversions, mutants and variants thereof, wherein said foodstuff prepared with said sol is capable of withstanding at least one freeze-thaw cycle more than a foodstuff prepared with a native waxy starch from the respective plant which is not of a wxsu2 genotype.

10. A thickened low-temperature stable foodstuff comprising at least a foodstuff and a sol comprising water and an effective amount of a starch from a waxy maize of a wxsu2 genotype, and translocations, inversions, mutants and variants thereof, wherein said foodstuff prepared with said sol is capable of withstanding at least one freeze-thaw cycle more than a foodstuff prepared with a native waxy maize starch which is not of a wxsu2 genotype.

11. The thickened foodstuff of claim 10 wherein said starch from waxy maize of a wxsu2 genotype is native.

12. The thickened foodstuff of claim 10 wherein said starch from waxy maize of a wxsu2 genotype is cross-linked.

13. The thickened foodstuff of claim 10 wherein said starch from waxy maize of a wxsu2 genotype is derivatized to contain substituent groups.

14. The thickened foodstuff of claim 10 wherein the foodstuff is a pie filling, tomato sauce, gravy or pudding.

* * * * *